Sept. 19, 1933.  C. SAURER ET AL  1,927,808
RUBBER SHOCK INSULATOR
Filed Aug. 15, 1930
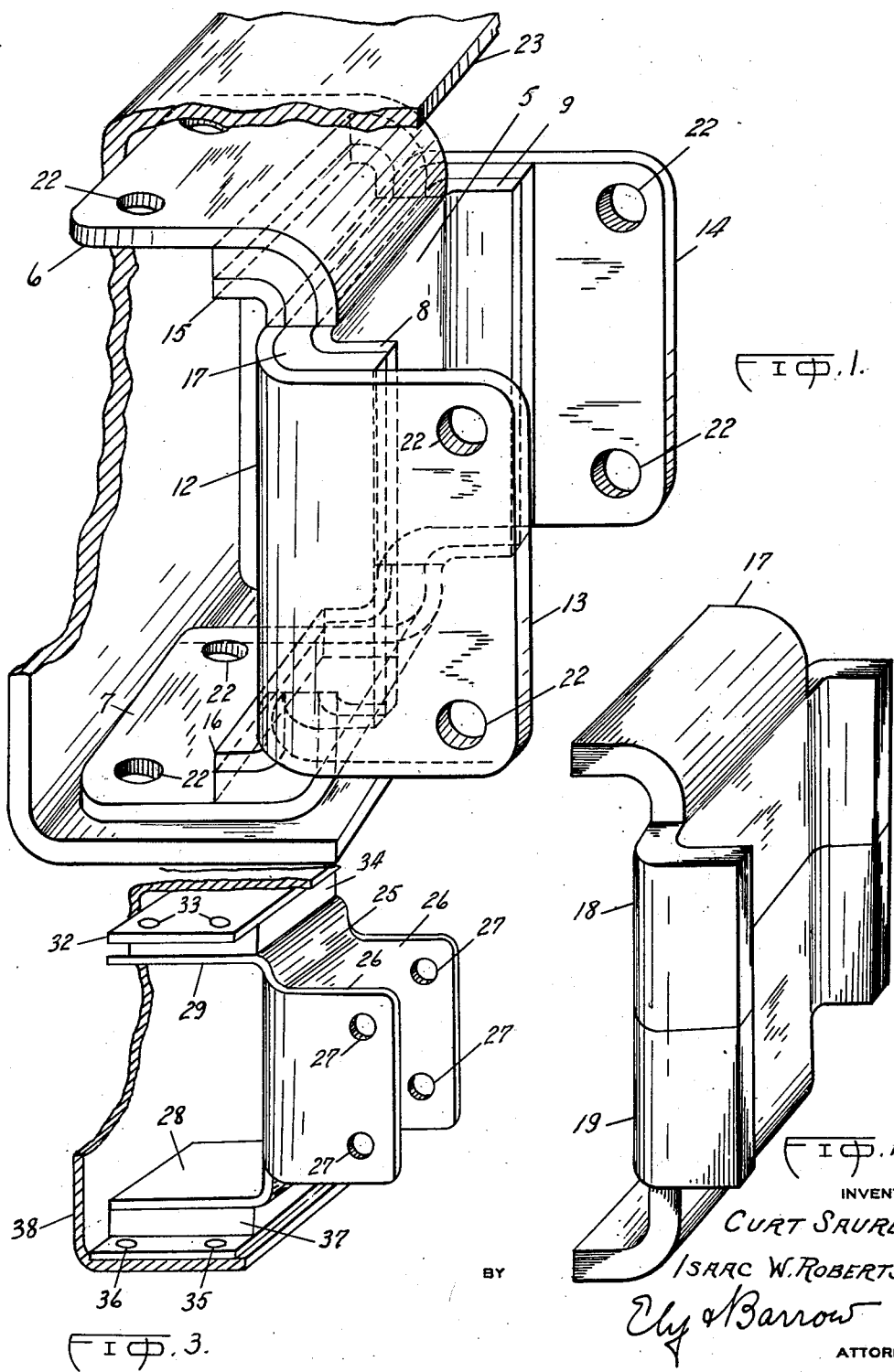
INVENTOR
CURT SAURER.
ISAAC W. ROBERTSON
BY Ely &Barrow
ATTORNEY Patented Sept. 19, 1933

1,927,808

UNITED STATES PATENT OFFICE 1,927,808

RUBBER SHOCK INSULATOR

Curt Saurer and Isaac W. Robertson, Akron, Ohio, assignors to The Firestone Tire & Rubber Company, Akron, Ohio, a corporation of Ohio Application August 15, 1930. Serial No. 475,509

7 Claims. (Cl. 248—14.2)

This invention relates to rubber shock insulators and more particularly to rubber motor supports.

The general object of the invention is the provision of an inexpensive, efficient shock insulator which can be readily adapted to a plurality of uses.

A more particular object of the invention resides in forming the rubber member of the shock insulator of a plurality of kinds of rubber so that the utmost cushioning effect is secured at all times and the liability for a break-down of the rubber is reduced.

A further object of the invention is to provide a shock insulator which will hold the parts together regardless of failure of the rubber member to adhere to the metal parts.

It is a further object of the invention to provide a shock insulator which serves to absorb vertical, lateral and longitudinal shocks and combinations thereof with equal facility.

The above and other objects of the invention are achieved by the apparatus illustrated in the accompanying drawings and described below, it being understood that the invention is not limited to the exact details thereof shown and described.

In the drawing:

Figure 1 is a perspective view of a preferred embodiment of the invention.

Figure 2 is a perspective view of the rubber member incorporated in the insulator shown in Figure 1.

Figure 3 is a perspective view of a modified form of the invention.

Referring to the drawing the numeral 5 indicates a metal plate which is formed with right angle, horizontal, top and bottom flanges 6 and 7 and parallel, oppositely-bent, vertical flanges 8 and 9. Formed similarly to the plate 5 is a mating plate 12 which is made with parallel, vertical flanges 13 and 14 and oppositely-bent, parallel, horizontal flanges 15 and 16.

As illustrated in Figure 1 the plates 5 and 12 are turned back to back and a rubber shock absorbing member 17 is provided between them. The member 17 is preferably vulcanized to each of the plates which are of suitable material or which may be coated with suitable material to insure good adhesion between the plate and the rubber. The rubber member 17 is preferably comprised of an upper portion 18 of relatively harder or stiffer rubber and a lower portion 19 of relatively softer rubber.

The flanges 6 and 7 on one plate and the flanges 13 and 14 on the other plate are provided with suitable means, such as holes 22, whereby the shock insulator can be secured between the members it is desired to insulate. The insulator shown is particularly adapted to be secured between a channel iron 23 of a motor vehicle frame and a gasoline motor (not shown).

It will be seen that in use the insulator will absorb vertical, lateral and longitudinal shocks as well as combinations thereof with equal facility and that in all cases the rubber will be under tension on one side and under compression on the other, a feature which adds to the shock absorbing qualities of the insulator without shortening the life thereof by increasing the chance of rupture of rubber in tension or failure of the rubber in compression as hereafter more fully explained. Even if the rubber breaks down from wear or excessive shock the plates are so interlocked that a mechanical failure of the joint will not occur.

A modification of the invention is illustrated in Figure 3 wherein the numeral 25 indicates a plate formed with parallel, vertical flanges 26, suitably apertured as at 27 and parallel, horizontal top and bottom flanges 28 and 29. A top fastening plate 32, which is somewhat longer than upper flange 29, so that the protruding edges thereof may be apertured as at 33 for the reception of fastening means, is secured to the flange 29 by a pad of rubber 34 which is preferably formed of relatively stiff rubber. A similar plate 35, apertured at 36, is secured to the bottom flange 28 by a relatively soft rubber pad 37. The plates 32 and 33 are particularly adapted to be secured to a channel iron 38.

The use of a relative soft rubber pad at the bottom and a relative stiff rubber pad at the top of the various forms of shock insulator above described has been found desirable. It is well known in the rubber art that rubber is much less resistive in tension than it is in compression and that moreover there is no such thing as true rubber compression but that rubber compression is really rubber displacement. These facts have been made use of in the design of the present insulator. The relative stiffness of the rubber used in the top and bottom of the insulator is such that the force required to compress the relatively soft rubber at the bottom is substantially equal to the force required to move the relatively stiff rubber at the top an equal distance into tension. It will be understood that by far the greater number of shocks arising will cause the rubber to be subjected to these particular forces especially when the insulator is used as a motor support on an automobile. It will thus be seen that the rubber at the top and the rubber at the bottom of the insulator will equally share the burden of absorbing the shock, a feature which would be totally absent if the rubbers were of equal stiffness. In this manner undue wear on only one of the rubber members or wear on only one portion of the rubber member is substantially prevented, giving a longer life to the insulator.

Moreover the use of relatively soft compression rubber and stiffer tension rubber has been found to give better shock absorbing qualities to the insulator as a greater relative movement will occur between the insulated parts than would occur using rubber of identical dimensions but of a uniform stiffness.

As many changes could be made in the insulator construction other than those described above, it is intended that all matter contained in the above description or illustrated in the accompanying drawings shall be interpreted as illustrative only and not in a limiting sense, accordingly various modifications of the invention can be resorted to without departing from the spirit of the invention or the scope of the appended claims.

What is claimed is:

1. A shock insulator comprising a plate formed with a pair of horizontal flanges and a pair of oppositely-turned, vertical flanges, a mating plate of identical form, said plates being in back-to-back relation, and a rubber shock insulator between said plates and the vertical and horizontal flanges thereof.

2. A shock insulator comprising a plate formed with a pair of horizontal flanges and a pair of oppositely-turned, vertical flanges, a mating plate of identical form, said plates being in interlocked relation, and a rubber shock insulator vulcanized to and between said plates and the vertical and horizontal flanges thereof, the upper portion of said rubber insulator being of relatively stiff rubber and the lower portion thereof being of relatively softer rubber.

3. A shock insulator comprising a plate, a mating plate of identical form, and a rubber shock insulator vulcanized to and between said plates, the upper portion of said rubber insulator carrying part of the load under tension and being of relatively stiff rubber and the lower portion thereof carrying part of the load under compression and being of relatively softer rubber.

4. A shock insulator including an attaching plate having upper and lower horizontal flanges, upper and lower horizontal plates spaced from said flanges and adapted to connect the upper and lower portions of said insulator to a supporting member, a pad of relatively stiff rubber vulcanized between said upper flange and upper plate and normally subjected to tension and a pad of relatively softer rubber vulcanized between said lower flange and lower plate and normally subjected to compression, the relative stiffnesses of the rubber, being such that the force required to compress the softer rubber will be substantially equal to the force required to move the stiffer rubber an equal distance into tension.

5. A shock insulator including an attaching plate having upper and lower horizontal flanges, upper and lower horizontal plates spaced from said flanges and adapted to connect the upper and lower portions of said insulator to a supporting member, a pad of relatively stiff rubber vulcanized between said upper flange and upper plate and normally subjected to tension and a pad of relatively softer rubber vulcanized between said lower flange and lower plate and normally subjected to compression.

6. A shock insulator comprising a plate formed with a pair of parallel, horizontal, top and bottom flanges, a top plate, a relatively stiff rubber body securing said top plate to the top flange, a bottom plate, and a relatively softer rubber body securing said bottom plate to said bottom flange.

7. A shock insulator comprising a plate formed with a pair of top and bottom flanges, a top plate, a relatively stiff rubber body securing said top plate to the top flange, a bottom plate, a relatively softer rubber body securing said bottom plate to said bottom flange, means for securing said first-named plate to one of the members to be insulated, and means for securing said top and bottom plate to the other of the members to be insulated.

CURT SAURER.
ISAAC W. ROBERTSON.